(12) United States Patent
Peera et al.

(10) Patent No.: US 12,187,980 B2
(45) Date of Patent: *Jan. 7, 2025

(54) POLYMERIC CLEANING BOOSTER

(71) Applicants: Dow Global Technologies LLC, Midland, MI (US); Rohm and Haas Company, Collegeville, PA (US)

(72) Inventors: Asghar A. Peera, Royersford, PA (US); Stephen J. Donovan, Sellersville, PA (US); Roy Roberts, Bristol, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 591 days.

This patent is subject to a terminal disclaimer.

(21) Appl. No.: 17/606,275

(22) PCT Filed: May 28, 2020

(86) PCT No.: PCT/US2020/034806
§ 371 (c)(1),
(2) Date: Oct. 25, 2021

(87) PCT Pub. No.: WO2020/251767
PCT Pub. Date: Dec. 17, 2020

(65) Prior Publication Data
US 2022/0213408 A1    Jul. 7, 2022

Related U.S. Application Data

(60) Provisional application No. 62/861,477, filed on Jun. 14, 2019.

(51) Int. Cl.
C11D 1/00     (2006.01)
C08F 20/06    (2006.01)
C11D 1/38     (2006.01)
C11D 11/00    (2006.01)

(52) U.S. Cl.
CPC .............. *C11D 1/008* (2013.01); *C08F 20/06* (2013.01); *C11D 1/38* (2013.01); *C11D 11/0094* (2013.01); *C11D 2111/12* (2024.01)

(58) Field of Classification Search
CPC ... C11D 11/008; C11D 11/0017; C11D 11/38; C08F 20/06
See application file for complete search history.

(56) References Cited

U.S. PATENT DOCUMENTS

| | | |
|---|---|---|
| 9,771,547 B2 | 9/2017 | Hulskotter et al. |
| 2005/0245428 A1 | 11/2005 | Rodrigues et al. |
| 2009/0005288 A1 | 1/2009 | Boutique et al. |
| 2013/0047892 A1* | 2/2013 | Palmer, Jr. ............ C07C 43/23 |
| | | 106/447 |
| 2013/0171210 A1 | 7/2013 | Baker et al. |
| 2014/0114006 A1* | 4/2014 | Palmer, Jr. ............ C08G 65/14 |
| | | 524/458 |
| 2014/0371126 A1 | 12/2014 | Rodrigues et al. |

(Continued)

FOREIGN PATENT DOCUMENTS

| | | |
|---|---|---|
| EP | 3197995 | 8/2017 |
| WO | 2016045026 | 3/2016 |

(Continued)

*Primary Examiner* — Mark Eashoo
*Assistant Examiner* — M. Reza Asdjodi
(74) *Attorney, Agent, or Firm* — Thomas S. Deibert

(57) ABSTRACT

A liquid laundry additive is provided, comprising a cleaning booster polymer having structural units of a monoethylenically unsaturated carboxylic acid monomer; structural units of an ethylenically unsaturated monomer of formula (I)

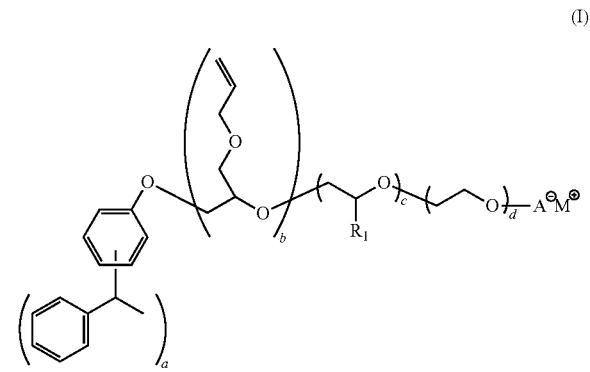

(I)

wherein a is an average of 1-3; wherein b is an average of 1-3; wherein c is an average of 0-5; wherein d is 4-100; wherein A is an anion; and wherein M is a cation charge balancing the anion; and optionally, structural units of an ethylenically unsaturated monomer of formula (II)

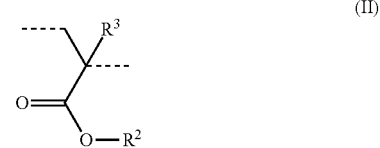

(II)

wherein each $R^2$ is independently selected from a —$C_{1-4}$ alkyl group; and wherein each $R^3$ is independently selected from the group consisting of a hydrogen and a methyl group.

8 Claims, No Drawings

(56) References Cited

U.S. PATENT DOCUMENTS

| | | | |
|---|---|---|---|
| 2015/0329479 A1 | 11/2015 | Ma et al. | |
| 2016/0090552 A1 | 3/2016 | Loughnane et al. | |
| 2016/0312152 A1 | 10/2016 | Borne et al. | |
| 2017/0369818 A1* | 12/2017 | Park | C11D 1/29 |
| 2020/0268619 A1* | 8/2020 | Xu | A61K 8/86 |
| 2021/0038494 A1* | 2/2021 | Qu | C11D 1/88 |
| 2022/0002638 A1* | 1/2022 | Peera | C11D 3/43 |
| 2022/0213408 A1* | 7/2022 | Peera | C11D 1/38 |
| 2022/0220418 A1* | 7/2022 | Peera | C11D 17/0008 |

FOREIGN PATENT DOCUMENTS

| | | | |
|---|---|---|---|
| WO | 2016048969 | 3/2016 | |
| WO | 2016106168 | 6/2016 | |
| WO | WO-2016106168 A1 * | 6/2016 | C11D 1/146 |
| WO | WO-2020251763 A1 * | 12/2020 | C11D 1/83 |
| WO | WO-2020251767 A1 * | 12/2020 | C08F 20/06 |

\* cited by examiner

POLYMERIC CLEANING BOOSTER

The present invention relates to a liquid laundry additive. In particular, the present invention relates to a liquid laundry additive, comprising a cleaning booster polymer having structural units of a monoethylenically unsaturated carboxylic acid monomer; structural units of an ethylenically unsaturated monomer of formula (I)

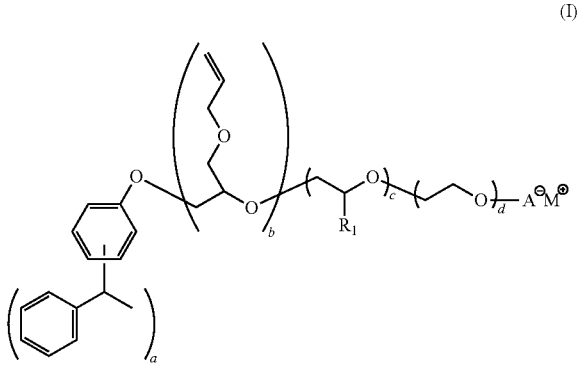

(I)

wherein a is an average of 1-3; wherein b is an average of 1-3; wherein c is an average of 0-5; wherein d is 4-100; wherein A is an anion; and wherein M is a cation charge balancing the anion; and, optionally, structural units of an ethylenically unsaturated monomer of formula (II)

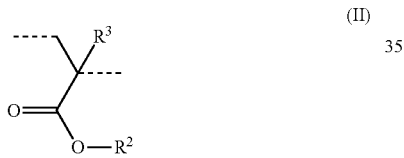

(II)

wherein each $R^2$ is independently selected from a $—C_{1-4}$ alkyl group; and wherein each $R^3$ is independently selected from the group consisting of a hydrogen and a methyl group.

Laundry detergents in liquid and gel forms providing excellent overall cleaning are desirable to consumers. Such laundry detergents typically include surfactants among other components to deliver the consumer desired cleaning benefits. Nevertheless, increasing sensitivity for the environment and rising material costs, a move to reduce the utilization of surfactants in laundry detergents is growing. Consequently, detergent manufactures are seeking ways to reduce the amount of surfactant per unit dose of the laundry detergent while maintaining overall cleaning performance.

One approach for reducing the unit dose of surfactant is to incorporate polymers into the liquid detergent formulations as described by Boutique et al. in U.S. Patent Application Publication No. 20090005288. Boutique et al. disclose a graft copolymer of polyethylene, polypropylene or polybutylene oxide with vinyl acetate in a weight ratio of from about 1:0.2 to about 1:10 for use in liquid or gel laundry detergent formulations having about 2 to about 20 wt % surfactant.

Notwithstanding, there remains a continuing need for liquid laundry additives that facilitate maintained primary cleaning performance with reduced surfactant loading in liquid or gel laundry detergent formulations; preferably, while also providing improved anti-redeposition performance.

The present invention provides a cleaning booster polymer, comprising: 50 to 95 wt %, based on dry weight of the cleaning booster polymer, of structural units of a monoethylenically unsaturated carboxylic acid monomer; 5 to 50 wt %, based on dry weight of the cleaning booster polymer, of structural units of an ethylenically unsaturated monomer of formula (I)

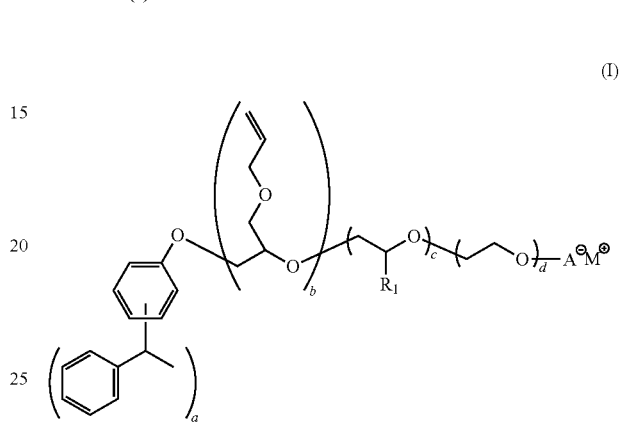

(I)

wherein a is an average of 1-3; wherein b is an average of 1-3; wherein c is an average of 0-5; wherein d is 4-100; wherein A is an anion and wherein M is an $NH_4^+$ charge balancing the anion; and 0 to 20 wt %, based on dry weight of the cleaning booster polymer, of structural units of an ethylenically unsaturated monomer of formula (II)

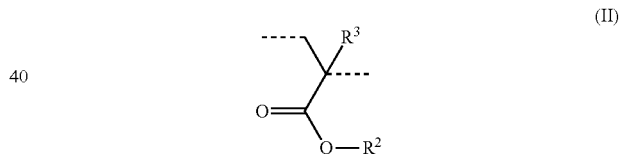

(II)

wherein each $R^2$ is independently selected from a $—C_{1-4}$ alkyl group and wherein each $R^3$ is independently selected from the group consisting of a hydrogen and a methyl group.

DETAILED DESCRIPTION

It has been surprisingly found that the liquid laundry additive as described herein facilitates an improvement in primary cleaning performance for dust sebum, while maintaining good anti-redeposition performance for ground clay.

Unless otherwise indicated, ratios, percentages, parts, and the like are by weight. Weight percentages (or wt %) in the composition are percentages of dry weight, i.e., excluding any water that may be present in the composition.

As used herein, unless otherwise indicated, the terms "weight average molecular weight" and "$M_w$" are used interchangeably to refer to the weight average molecular weight as measured in a conventional manner with gel permeation chromatography (GPC) and conventional standards, such as polystyrene standards. GPC techniques are discussed in detail in Modern Size Exclusion Liquid Chromatography: Practice of Gel Permeation and Gel Filtration Chromatography, Second Edition, Striegel, et al., John Wiley & Sons, 2009. Weight average molecular weights are reported herein in units of Daltons.

The term "structural units" as used herein and in the appended claims refers to the remnant of the indicated monomer; thus a structural unit of (meth)acrylic acid is illustrated:

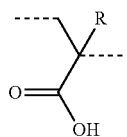

wherein the dotted lines represent the points of attachment to the polymer backbone and where R is a hydrogen for structural units of acrylic acid and a —CH$_3$ group for structural units of methacrylic acid.

Preferably, the liquid laundry additive of the present invention, comprises a cleaning booster polymer as described herein. More preferably, the liquid laundry additive of the present invention, comprises: water and a cleaning booster polymer as described herein; wherein the cleaning booster is dispersed in the water. Most preferably, the liquid laundry additive of the present invention, comprises: 5 to 85 wt % (preferably, 20 to 80 wt %; more preferably, 30 to 75 wt %; most preferably, 40 to 60 wt %) water and 15 to 95 wt % (preferably, 20 to 80 wt %; more preferably, 25 to 70 wt %; most preferably, 40 to 60 wt %) of a cleaning booster polymer as described herein.

Preferably, the cleaning booster polymer of the present invention comprises: a cleaning booster polymer, comprising: 50 to 95 wt % (preferably, 60 to 92 wt %; more preferably, 70 to 90 wt %; most preferably, 75 to 85 wt %), based on dry weight of the cleaning booster polymer, of structural units of a monoethylenically unsaturated carboxylic acid monomer; 5 to 50 wt % (preferably, 8 to 40 wt %; more preferably, 10 to 30 wt %; most preferably, 15 to 25 wt %), based on dry weight of the cleaning booster polymer, of structural units of an ethylenically unsaturated monomer of formula (I)

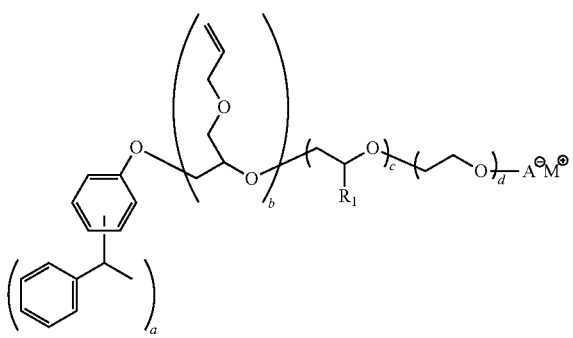

(I)

wherein a is an average of 1-3 (preferably, 1-2; most preferably 2); wherein b is an average of 1-3 (preferably, 1-2; most preferably, 1); wherein c is an average of 0-5 (preferably, 0-2; most preferably, 0); wherein d is 4-100 (preferably, 5-50; more preferably, 7.5 to 20; most preferably, 10 to 20); wherein A is an anion (preferably, a SO$_3^-$ or a PO$_3^{2-}$; more preferably, SO$_3^-$);

and wherein M is an NH$_4^+$ cation charge balancing the anion; and 0 to 20 wt % (preferably, 0 to 15 wt %; more preferably, 0 to 10 wt %; still more preferably, 0 to 5 wt %; most preferably, 0 wt %), based on dry weight of the cleaning booster polymer, of structural units of an ethylenically unsaturated monomer of formula (II)

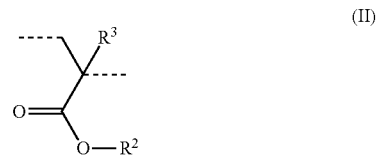

(II)

wherein each R$^2$ is independently selected from a —C$_{1-4}$ alkyl group; and wherein each R$^3$ is independently selected from the group consisting of a hydrogen and a methyl group.

Preferably, the cleaning booster polymer used in the liquid laundry detergent formulation of the present invention has a weight average molecular weight, M$_w$, of 500 to 100,000 Daltons (preferably, 1,000 to 50,000 Daltons; more preferably, 2,000 to 20,000 Daltons; most preferably, 2,500 to 7,500 Daltons).

Preferably, the cleaning booster polymer of the present invention comprises: 50 to 95 wt % (preferably, 60 to 92 wt %; more preferably, 70 to 90 wt %; most preferably, 75 to 85 wt %), based on dry weight of the cleaning booster polymer, of structural units of a monoethylenically unsaturated carboxylic acid monomer. More preferably, the cleaning booster polymer of the present invention comprises: 50 to 95 wt % (preferably, 60 to 92 wt %; more preferably, 70 to 90 wt %; most preferably, 75 to 85 wt %), based on dry weight of the cleaning booster polymer, of structural units of a monoethylenically unsaturated carboxylic acid monomer; wherein the monoethylenically unsaturated carboxylic acid monomer is selected from monoethylenically unsaturated monomers that contain at least one carboxylic acid group. Still more preferably, the cleaning booster polymer of the present invention comprises: 50 to 95 wt % (preferably, 60 to 92 wt %; more preferably, 70 to 90 wt %; most preferably, 75 to 85 wt %), based on dry weight of the cleaning booster polymer, of structural units of a monoethylenically unsaturated carboxylic acid monomer; wherein the monoethylenically unsaturated carboxylic acid monomer is selected from the group consisting of (meth)acrylic acid, (meth)acryloxypropionic acid, itaconic acid, aconitic acid, maleic acid, maleic anhydride, fumaric acid, crotonic acid, citraconic acid, maleic anhydride, monomethyl maleate, monomethyl fumarate, monomethyl itaconate, and other derivatives such as corresponding anhydride, amides, and esters. Yet still more preferably, the cleaning booster polymer of the present invention comprises: 50 to 95 wt % (preferably, 60 to 92 wt %; more preferably, 70 to 90 wt %; most preferably, 75 to 85 wt %), based on dry weight of the cleaning booster polymer, of structural units of a monoethylenically unsaturated carboxylic acid monomer; wherein the monoethylenically unsaturated carboxylic acid monomer is selected from the group consisting of acrylic acid, methacrylic acid and mixtures thereof. Still yet more preferably, the cleaning booster polymer of the present invention comprises: 50 to 95 wt % (preferably, 60 to 92 wt %; more preferably, 70 to 90 wt %; most preferably, 75 to 85 wt %), based on dry weight of the cleaning booster polymer, of structural units of a monoethylenically unsaturated carboxylic acid monomer;

wherein the monoethylenically unsaturated carboxylic acid core monomer includes acrylic acid. Most preferably, the cleaning booster polymer of the present invention comprises: 50 to 95 wt % (preferably, 60 to 92 wt %; more preferably, 70 to 90 wt %; most preferably, 75 to 85 wt %), based on dry weight of the cleaning booster polymer, of structural units of a monoethylenically unsaturated carboxylic acid monomer; wherein the monoethylenically unsaturated carboxylic acid core monomer is acrylic acid.

Preferably, the cleaning booster polymer of the present invention comprises: 50 to 95 wt % (preferably, 60 to 92 wt %; more preferably, 70 to 90 wt %; most preferably, 75 to 85 wt %), based on dry weight of the cleaning booster polymer, of structural units of a monoethylenically unsaturated carboxylic acid monomer; wherein the structural units of the monoethylenically unsaturated carboxylic acid monomer are structural units of formula (III)

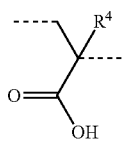

(III)

wherein each $R^4$ is independently selected from a hydrogen and a —$CH_3$ group (preferably, a hydrogen). Most preferably, the cleaning booster polymer of the present invention, comprises: 50 to 95 wt % (preferably, 60 to 92 wt %; more preferably, 70 to 90 wt %; most preferably, 75 to 85 wt %), based on dry weight of the cleaning booster polymer, of structural unites of a monoethylenically unsaturated carboxylic acid monomer; wherein the structural units of the monoethylenically unsaturated monocarboxylic acid monomer are structural units of formula (III), wherein each $R^4$ is independently selected from a hydrogen and a —$CH_3$ group; wherein $R^4$ is a hydrogen in 50 to 100 mol % (preferably, 75 to 100 mol %; more preferably, 90 to 100 mol %; still more preferably, 98 to 100 mol %; most preferably, 100 mol %) of the structural units of formula (III) in the cleaning booster polymer.

Preferably, the cleaning booster polymer of the present invention comprises: 5 to 50 wt % (preferably, 8 to 40 wt %; more preferably, 10 to 30 wt %; most preferably, 15 to 25 wt %), based on dry weight of the cleaning booster polymer, of structural units of an ethylenically unsaturated monomer of formula (I)

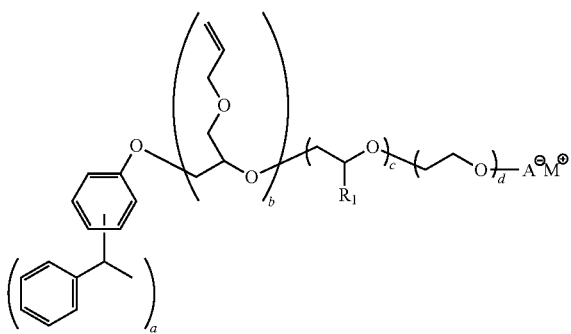

(I)

wherein a is an average of 1-3 (preferably, 1-2; most preferably 2); wherein b is an average of 1-3 (preferably, 1-2; most preferably, 1); wherein c is an average of 0-5 (preferably, 0-2; most preferably, 0); wherein d is 4-100 (preferably, 5-50; more preferably, 7.5 to 20; most preferably, 10 to 20); wherein A is an anion (preferably, a $SO_3^-$ or a $PO_3^{2-}$; more preferably, $SO_3^-$); and wherein M is an $NH_4^+$ charge balancing the anion. More preferably, the cleaning booster polymer of the present invention comprises: 5 to 50 wt % (preferably, 8 to 40 wt %; more preferably, 10 to 30 wt %; most preferably, 15 to 25 wt %), based on dry weight of the cleaning booster polymer, of structural units of an ethylenically unsaturated monomer of formula (I), wherein a is an average of 2, wherein b is 1, wherein c is 0, wherein d is an average of 10 to 20, wherein A is $SO_3^-$ and wherein M is an $NH_4^+$.

Preferably, the cleaning booster polymer of the present invention comprises: 0 to 20 wt % (preferably, 0 to 15 wt %; more preferably, 0 to 10 wt %; still more preferably, 0 to 5 wt %; most preferably, 0 wt %), based on dry weight of the cleaning booster polymer, of structural units of an ethylenically unsaturated monomer of formula (II)

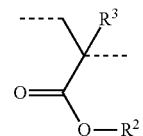

(II)

wherein each $R^2$ is independently selected from a —$C_{1-4}$ alkyl group (preferably, a methyl group, an ethyl group and a butyl group; more preferably, an ethyl group and a butyl group; most preferably, an ethyl group) and wherein each $R^3$ is independently selected from the group consisting of a hydrogen and a methyl group (preferably, a hydrogen). More preferably, the cleaning booster polymer of the present invention comprises: 0 to 5 wt % (preferably, 0 to 3 wt %; more preferably, 0 to 2 wt %; most preferably, 0 wt %), based on dry weight of the cleaning booster polymer, of structural units of an ethylenically unsaturated monomer of formula (II), wherein $R^2$ is an ethyl group in 75 to 100 mol % (preferably, 90 to 100 mol %; more preferably, 98 to 100 mol %; most preferably, 100 mol %) of the structural units of formula (II) in the cleaning booster polymer and wherein $R^3$ is a hydrogen in 75 to 100 mol % (preferably, 90 to 100 mol %; more preferably, 98 to 100 mol %; most preferably, 100 mol %) of the structural units of formula IV in the cleaning booster polymer.

Preferably, the cleaning booster polymer of the present invention contains <1 wt % (preferably, <0.5 wt %; more preferably, <0.2 wt %; still more preferably, <0.1 wt %; yet still more preferably, <0.01 wt %; most preferably, <the detectable limit), based on the dry weight of the liquid laundry additive, of a vinyl alcohol polymer (PVA). More preferably, the cleaning booster polymer of the present invention contains <1 wt % (preferably, <0.5 wt %; more preferably, <0.2 wt %; still more preferably, <0.1 wt %; yet still more preferably, <0.01 wt %; most preferably, <the detectable limit), based on the dry weight of the liquid laundry additive, of a vinyl alcohol polymer (PVA); wherein the vinyl alcohol polymer has a degree of saponification of 80 to 100 mol % (determined using the method specified in JIS K 6726 (1994)). Most preferably, the cleaning booster polymer of the present invention contains <1 wt % (preferably, <0.5 wt %; more preferably, <0.2 wt %; still more preferably, <0.1 wt %; yet still more preferably, <0.01 wt %; most preferably, <the detectable limit), based on the dry weight of the liquid laundry additive, of a vinyl alcohol polymer (PVA); wherein the vinyl alcohol polymer may include modified vinyl alcohol polymer. Modified vinyl alcohol polymer includes anion-modified PVA (e.g., sulfonic acid group modified PVA and carboxylic acid group-modified PVA); cation-modified PVA (e.g., quaternary amine group-modified PVA); amide-modified PVA; acetoacetyl group-modified PVAs; diacetone acrylamide-modified PVA and ethylene-modified PVA.

Some embodiments of the present invention will now be described in detail in the following Examples.

Synthesis 51: Polymer 1

A two liter round bottom flask, equipped with a mechanical stirrer, heating mantle, thermocouple, condenser and inlets for the addition of monomer(s), initiator and chain regulator was charged with deionized water (300 g). The flask contents were set to stir and heated to 74° C. Once the flask contents reached reaction temperature of 74° C., a 0.15% aqueous iron sulfate heptahydrate promoter solution (2.5 g) was added, followed by the addition of sodium metabisulfite (SMBS) (1.43 g) dissolved in deionized water (7.0 g) as a pre-charge. Then, separate feeds were made to the flask contents, as follows:

- Initiator co-feed: sodium persulfate (5.98 g) dissolved in deionized water (25 g) was fed to the flask over 110 minutes.
- Chain Transfer Agent (CTA) co-feed: sodium metabisulfite (22.43 g) dissolved in deionized water (40 g) was fed to the flask over 98 minutes.
- Monomer co-feed: A monomer solution containing glacial acrylic acid (239.2 g) and an ethylenically unsaturated monomer of formula (I), wherein a is 2, wherein b is 1, wherein c is 0, wherein d is 15, wherein A is —$SO_3^-$ and wherein M is an $NH_4^+$ (available from Ethox Chemicals, LLC under the name E-Sperse® RS-1596) (59.8 g) was fed to the flask over 95 minutes.

Upon completion of the co-feeds, deionized water (10 g) was added as rinse. The flask contents were then held for at 74° C. for 10 minutes. At the completion of the hold, two sequential chase solutions were added to the flask with a 5 minute hold between the chase additions. Both chases comprised sodium persulfate (0.42 g) and deionized water (8 g) and were added over 10 minutes. Then a 35% aqueous hydrogen peroxide scavenger solution (3 g) was added to the flask contents. The flask contents were then cooled to <35° C. The product polymer had a solids content of 45.9%, pH was 1.62, Brookfield viscosity of 520 cps. Residual monomer measured at below 52 ppm. Final weight average molecular weight, $M_w$, as measured by Gel Permeation Chromatography was 5,721 Daltons.

Comparative Example C1 and Example 1: Liquid Laundry Detergent

The liquid laundry detergent formulations used in the cleaning tests in the subsequent Examples were prepared having the generic formulation as described in TABLE 1 with the cleaning booster polymer as noted in TABLE 2 and were prepared by standard liquid laundry formulation preparation procedures.

TABLE 1

| Ingredient | Commercial Name | wt % |
|---|---|---|
| Linear alkyl benzene sulfonate | Nacconal 90G* | 8.0 |
| Sodium lauryl ethoxysulfate | Steol CS-460* | 2.0 |
| Non-ionic surfactant | Biosoft N25-7* | 4.0 |
| Cleaning Booster polymer | — | 3.0 |
| Deionized water | — | QS to 100 |

*available from Stepan Company

TABLE 2

| Example | Cleaning Booster Polymer |
|---|---|
| Comp. Ex. C1 | ethoxylated poly(ethyleneimine)[1] |
| Ex. 1 | Polymer 1 |

[1]available from BASF under the tradename Sokolan™ HP-20

Primary Cleaning Performance

The primary cleaning performance of the liquid laundry detergent formulations of Comparative Example C1 and Example 1 were assessed in a Terg-o-tometer Model TOM-52-A available from SR Lab Instruments (6×1 L wells) agitated at 90 cycles per minute with the conditions noted in TABLE 3.

TABLE 3

| Parameter | Setting |
|---|---|
| Temperature | 15° C. |
| Water hardness | 200 ppm, Ca/Mg = 2/1 |
| Fabric Types (3 in each well) | Stained Cotton 400 |
| Stains | Clay, Motor Oil and Dust Sebum (Bought from Scientific Services S/D, Inc.) |
| Wash time | 16 minutes |
| Rinse time | 3 minutes |
| Liquid laundry detergent dosage | 0.5 g/L |

The soil removal index (SRI) was calculated using ASTM Method D4265-14. The ΔSRI was determined in reference to a control detergent with the same surfactant concentrations absent cleaning booster. The results are provided in TABLE 4.

TABLE 4

| | Stain ΔSRI | | |
|---|---|---|---|
| Example | Ground Clay | Motor Oil | Dust Sebum |
| Comp. Ex. C1 | +8 | +5 | +1 |
| Ex. 1 | +7 | +3 | +4 |

We claim:
1. A liquid laundry additive, comprising:
a cleaning booster polymer, comprising:
50 to 95 wt %, based on dry weight of the cleaning booster polymer, of structural units of a monoethylenically unsaturated carboxylic acid monomer;
5 to 50 wt %, based on dry weight of the cleaning booster polymer, of structural units of an ethylenically unsaturated monomer of formula (I)

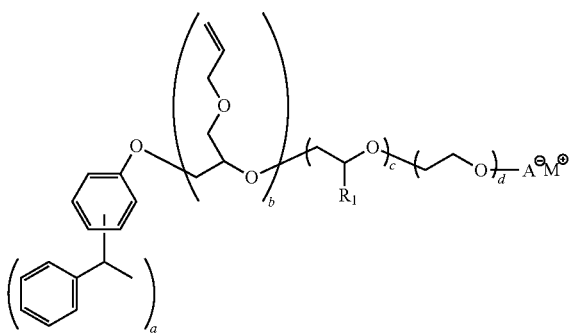

(I)

wherein a is an average of 1-3; wherein b is 1; wherein c is 0; wherein d is 4-100; wherein A is an anion (preferably, a $SO_3^-$ or a $PO_3^{2-}$; more preferably, $SO_3^-$); and wherein M is an $NH_4^+$ charge balancing the anion; and 0 to 20 wt %, based on dry weight of the cleaning booster polymer, of structural units of an ethylenically unsaturated monomer of formula (II)

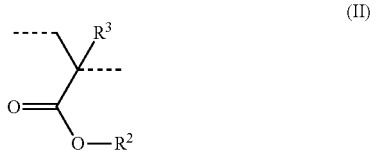

(II)

wherein each $R^2$ is independently selected from a —$C_{1-4}$ alkyl group; and wherein each $R^3$ is independently selected from the group consisting of a hydrogen and a methyl group.

2. The liquid laundry additive of claim 1, wherein the cleaning booster polymer has a weight average molecular weight, $M_w$, of 500 to 100,000 Daltons.

3. The liquid laundry additive of claim 2, wherein the structural units of monoethylenically unsaturated carboxylic acid monomer are structural units of formula (III)

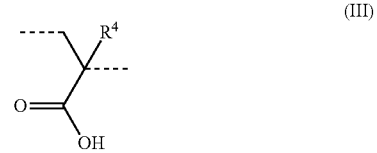

(III)

wherein each $R^4$ is independently selected from a hydrogen and a —$CH_3$ group.

4. The liquid laundry additive of claim 3, wherein each $R^4$ is a hydrogen in 50 to 100 mol % of the structural units of formula (III) in the cleaning booster polymer.

5. The liquid laundry additive of claim 4, wherein a is an average of 2.

6. The liquid laundry additive of claim 5, wherein d is 10 to 20.

7. The liquid laundry additive of claim 6, wherein A is a $SO_3^-$.

8. The liquid laundry additive of claim 7, wherein the liquid laundry additive contains ≤1 wt %, based on the dry weight of the liquid laundry additive, of a vinyl alcohol polymer.

* * * * *